April 22, 1969     J. D. QUILLEN     3,439,516

CYCLE LOCK

Filed Sept. 19, 1966     Sheet _1_ of 5

INVENTOR.
JOHN D. QUILLEN
BY William R. Piper
ATTORNEY

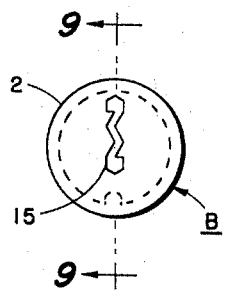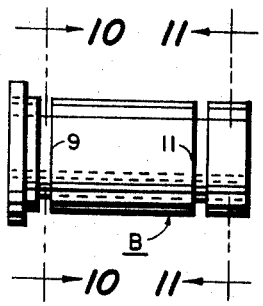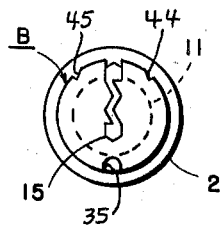
FIG. 8　　FIG. 8A　　FIG. 8B
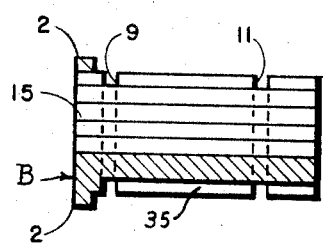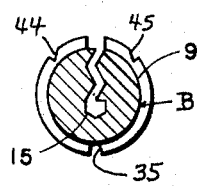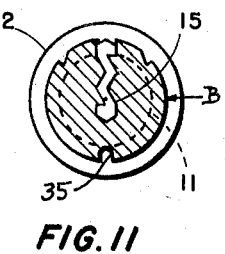
FIG. 9　　FIG. 10　　FIG. 11
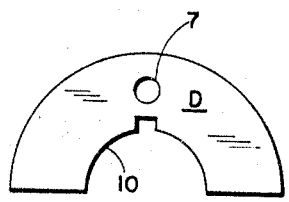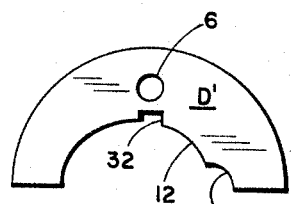
FIG. 12　　FIG. 13
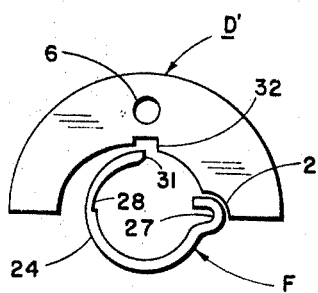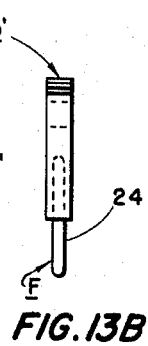
FIG. 13A　　FIG. 13B
INVENTOR.
JOHN D. QUILLEN
BY William R. Piper
ATTORNEY

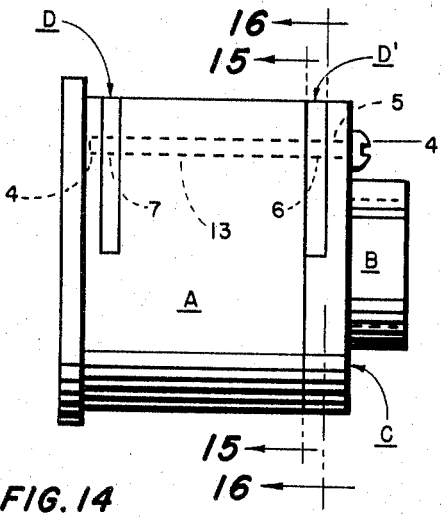
FIG. 14
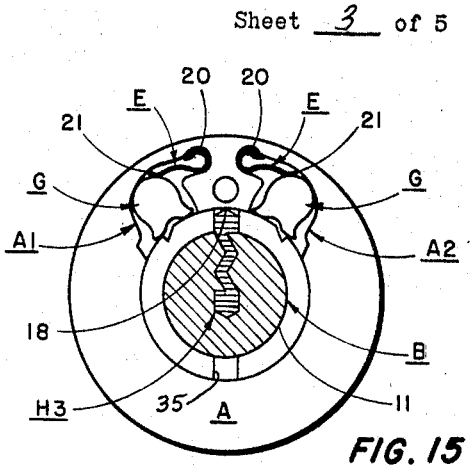
FIG. 15
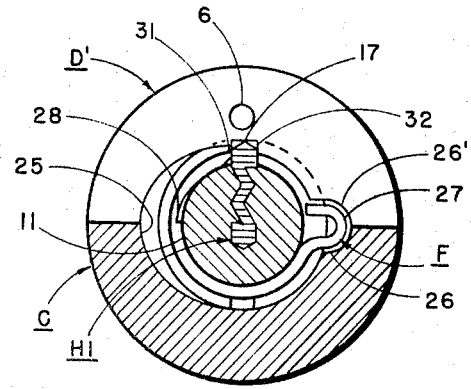
FIG. 16
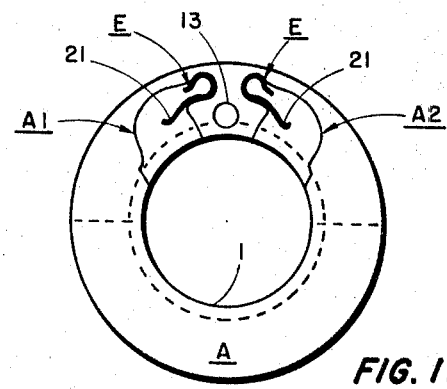
FIG. 17
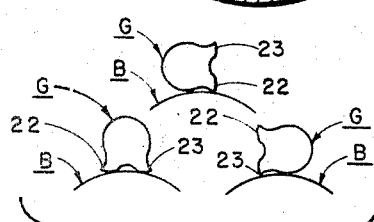
FIG. 18
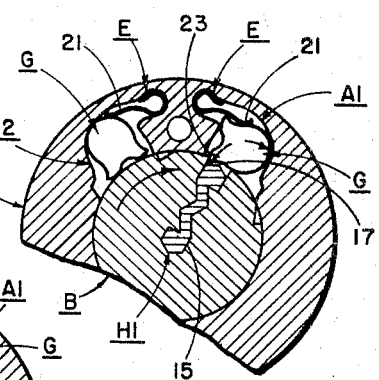
FIG. 19
FIG. 20
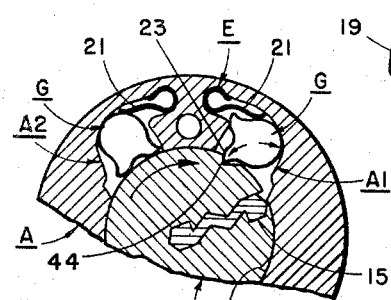
FIG. 20A
INVENTOR.
JOHN D. QUILLEN
BY William R. Piper
ATTORNEY

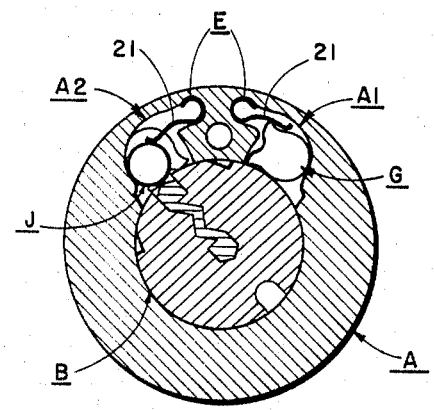
FIG. 27
FIG. 28
FIG. 28A
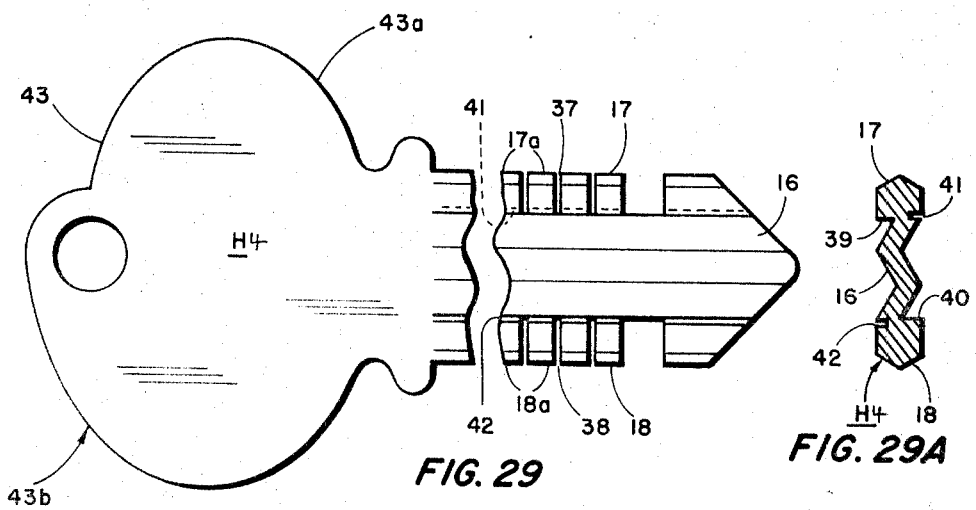
FIG. 29
FIG. 29A

United States Patent Office 3,439,516
Patented Apr. 22, 1969

3,439,516
CYCLE LOCK
John D. Quillen, 790 Woodland Ave.,
San Leandro, Calif. 94577
Filed Sept. 19, 1966, Ser. No. 580,229
Int. Cl. E05b 25/00, 27/08, 35/00
U.S. Cl. 70—383          12 Claims

ABSTRACT OF THE DISCLOSURE

A cycle lock in which two sets of tumblers are used and a key actuated plug is rotatably mounted in the lock body and has a key slot with one side opening out to the cylindrical periphery of the plug. The tumblers are solid discs and have arcuate edge portions that permit the tumblers to individually rotate in the lock body. Each tumbler is spring biased and has a pair of lobes that will be forced into the key slot as the plug is rotated by the key if the key has a notch that is in alignment with this tumbler. The present invention differs from my Patent No. 3,255,620, in that resilient tumblers are used in the patented cycle lock while in my present lock the tumblers are nonresilient but are spring biased.

---

The present cycle lock is an improvement over the cycle lock disclosed in my Patent No. 3,255,620, issued on June 4, 1966. In the patent I provided a lock, one set of tumblers of which automatically set themselves to the key which operates it from the unlocked to the locked position, and having been so locked with a particular key, no other key can be used to unlock it by operating the same set of tumblers. The lock also has a second set of tumblers which automatically set themselves to a second key which operates them from unlocked to locked position. The lock, therefore, can be operated by two independent keys and the first set of tumblers will not interfere with the operation of the second key actuating the second set of tumblers in unlocking the lock and vice versa. My patent further disclosed a cycle lock in which a third key could be used for returning the tumblers in both sets to neutral position.

An object of the present invention is to provide an improved cycle lock in which the tumblers are solid and have a periphery of a particular shape for a purpose which will hereinafter be described in detail. My patent shows a tumbler with resilient yoke that can be flexed from neutral position and will have a tendency to return to neutral position. The solid tumbler in my present case is actuated by a spring finger. In fact the tumblers in each set are spring biased by a comb-like spring in which each tine of the comb yieldingly bears against a separate tumbler for actuating it.

A further object is to provide a device of the type described in which novel means is provided for preventing the lock from being "picked" because the tumblers are concealed from access to them through the slot that receives the key.

A further object of my invention is to provide a key blank that has break-off portions along each edge permitting a person to manually break off different portions along the key edge to set up his own lock combination. Also a different lock combination can be configured along each edge of the same key. The handle of the key can be formed so that the operator will know which edge of the key to use in operating the lock.

Other objects and advantages will appear as the specification continues and the novel features of the invention will be set forth in the appended claims.

For a better understanding of my invention, reference should be made to the accompanying drawings forming a part of this application in which.

Figure 4:
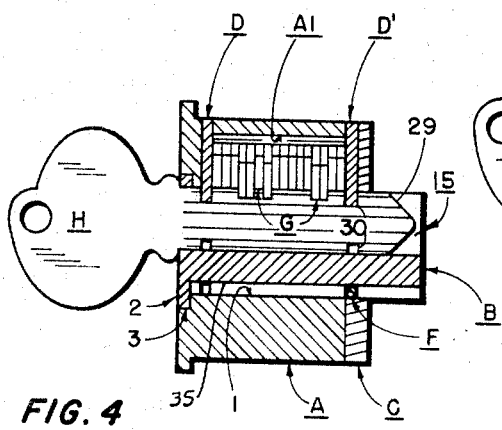
FIGURE 4 is a longitudinal section through the cycle lock and is taken along the line 4—4 of FIGURE 23, and illustrates a "subordinate" key in association with the "subordinate" tumbler set in the cycle lock.
Figure 7:
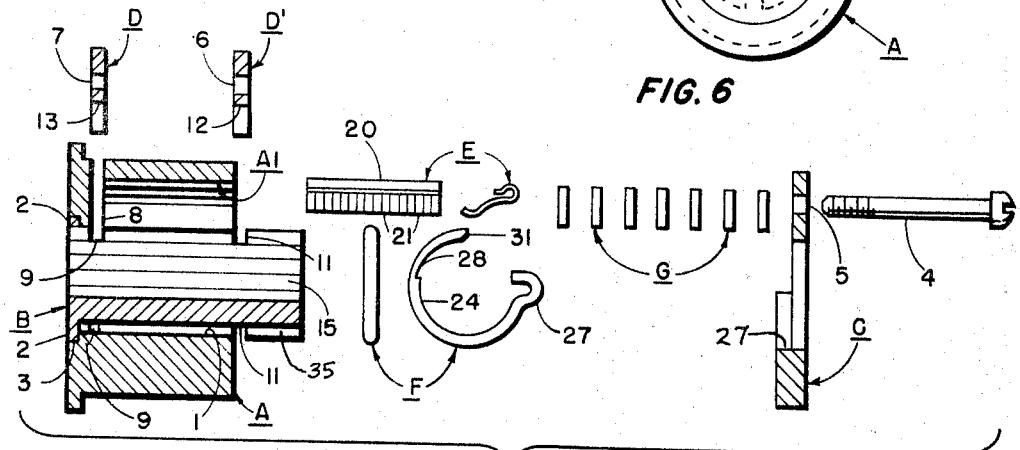

FIGURE 7 is a longitudinal section similar to FIGURE 4, but the various elements of the cycle lock are illustrated in exploded position. The plug is shown in the cylinder casing, but a few of the tumblers for the "subordinate" tumbler set are shown in spaced relation. Other parts are separated from the cylinder and plug.

FIGURES 8A and 8B are front, side and rear elevational views respectively of the key actuated plug for the cycle lock.

FIGURES 9, 10 and 11 are longitudinal and transverse sections through the plug and are taken along the line 9—9 of FIGURE 8, and along the lines 10—10 and 11—11 of FIGURE 8A.

FIGURES 12 and 13 are plan views of the front and rear keeper plates used in the cycle lock when looking from the front of the lock.

FIGURES 13A and 13B are plan and end views respectively of the rear keeper plate in association with a keeper spring.

FIGURE 14 is an enlarged side elevation of the cycle lock and illustrates how the front and rear keeper plates are secured to the lock casing.

FIGURES 15 and 16 are transverse sections taken along the lines 15—15 and 16—16 of FIGURE 14.

FIGURE 17 is a rear view of the cycle lock with all of the components removed except the comb-like springs are shown in position.

FIGURE 18 illustrates three plan views of one of the solid tumblers and showing it in three different rotative positions. The left hand view shows the tumbler in neutral position while the other two views show the tumbler in two different "locked" positions.

Figure 5:
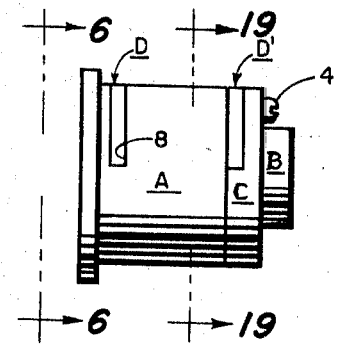
FIGURE 5 is a side elevation of the cycle lock.

FIGURE 19 is a partial transverse section taken along the line 19—19 of FIGURE 5, and illustrates the blocking action of one of the tumblers in the "subordinate" tumbler set, as the key endeavors to rotate the plug in a clockwise direction from locked to unlocked position.

FI1URE 20 is a section similar to FIGURE 19, and shows the tumbler in another "locked" position and preventing the plug from being rotated clockwise.

FIGURE 20A is similar to FIGURE 20, but shows the tumbler engaging with a notch in the plug to stop clockwise rotation of the plug.

FIGURES 21 to 26 inclusive are transverse sections through the cycle lock and are similar to the sections shown in FIGURES 19 and 20, and illustrate different relative positions between the rotatable plug and the two sets of tumblers.

FIGURE 27 is a transverse section through the cycle lock and illustrates a spacer disc that is placed between certain of the tumblers. The master set of tumblers may have one or more spacing discs arranged along the set.

FIGURES 28 and 28A show plan and edge views respectively of one of the spacing discs.

FIGURE 29 shows an enlarged side view of a portion of a modified form of a key that has opposed edges each being provided with sections that can be broken off to set up a tumbler actuating combination when the key is used in the cycle lock. FIGURE 29A is a transverse section taken through the key shown in FIGURE 29.

While I have shown only the preferred forms of my invention, it should be understood that various changes, or modifications, may be made within the scope of the annexed claims without departing from the spirit thereof.

Figure 6:
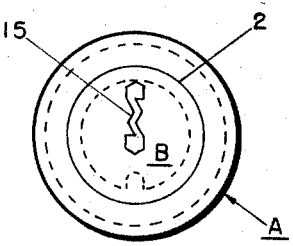
FIGURE 6 is a front view of the cycle lock when looking in the direction of the arrows 6—6 of FIGURE 5.

In carrying out my invention, I provide a cylindrical casing or body A for the cycle lock as shown in FIGURES 4, 5 and 6. The body A has a cylindrical bore 1, extending longitudinally therethrough and a key actuated plug B, is rotatably mounted in the bore. The plug B has a cylindrical body with an outwardly extending annular flange 2 at its front end, see also the front, side and end views of the plug in FIGURES 8, 8A and 8B, and the sectional views of FIGURES 9, 10 and 11. The lock casing A has an annular recess 3 for rotatably receiving the plug flange. An end plate C is secured to the rear end of the casing A and is secured in place by a screw 4, see FIGURE 14. The screw passes through an opening 5 in the end plate and also passes through openings 6 and 7 that are provided in a rear keeper plate D' and a front keeper plate D, respectively, as shown in FIGURE 14.

The keeper plates D and D' are illustrated in FIGURES 12 and 13 and they are in the shape of half circles. The casing A in FIGURE 7 has a slot 8 for receiving the front keeper plate D, and a plug B has an annular groove 9, see FIGURES 8A, 9 and 10, for receiving the arcuate inner edge 10, see FIGURE 12, of the same plate. The rear keeper plate D' is placed at the back of the casing A, as shown in FIGURE 4 and then the end plate C is placed against the plate D' and is secured in position by the screw 4. The plug B has a second annular groove 11, see FIGURES 8 and 11, for receiving the arcuate inner edge 12 of the rear keeper plates D and D', and the opening 7 in the front keeper plate D is threaded for receiving the threaded end of the screw 4. The casing A also has a threaded recess 14 as shown in FIGURE 14, that registers with the threaded bore 7 so as to receive the end of the screw 4.

The plug B has a key slot 15 of a particular shape and the slot extends longitudinally through the plug for removably receiving a key indicated generally at H, in FIGURES 1 to 4 inclusive. The slot 15 does not extend into the annular flange 2, as is clearly shown in FIGURES 6, 8 and 9, but it does open out to the cylindrical periphery of the body of the plug B as illustrated in FIGURE 9. A "subordinate" key is shown at H1 in side elevation and in transverse section. The web 16 that lies between the two parallel side ridges 17 and 18 is so angularly shaped in cross-section and the key slot 15 is likewise so shaped that the key may be inserted into the slot with its ridge 17 being disposed adjacent to the periphery of the cylindrical portion of the plug B, or the key can be rotated about its longitudinal axis of 180°, and then inserted into the key slot for bringing the other ridge 18 adjacent to the plug periphery. The purpose for this will be described hereinafter.

Figure 1:
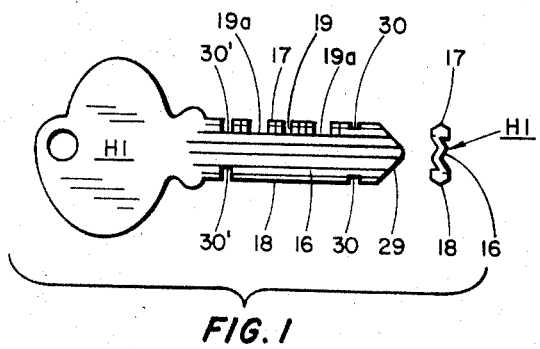
FIGURE 1 is a side elevation and a cross section of a "subordinate or permissive" key used in the cycle lock.

The ridge 17 has two inclined portions meeting along a line to form it. The same is true of the ridge 18 at the opposite edge of the key H1. FIGURE 11 shows the portion of the key slot 15 that extends adjacent to the annular flange 2 as having an inverted V for receiving either the ridge 17 of the key H1 or the ridge 18 of the same key, this depending upon the position of the key when it is inserted into the key slot. The side elevation of the key H1 in FIGURE 1 shows the ridge 17 with a number of notches 19 therein. Certain of these notches are of one width while others 19a are double this width. The notches 19 and 19a are for the purpose of receiving cycle lock tumblers G. Before describing the tumblers G, it is best to illustrate the three types of keys H.

The "subordinate" key H1 shown in FIGURE 1, has its ridge 17 provided with notches 19 and 19a while the other ridge 18 is plane and has no notches in it. Guide or dual notches 30 are placed on opposite ridges 17 and 18 and are disposed near a pointed end 29 of the key. The guide notches 30 can receive the arcuate inner edge 12 of the rear keeper plate D', see FIGURES 4, 7 and 13. The key H1 has another pair of guide notches 30' near the front end of the key and these notches receive the arcuate inner edge 10 of the front keeper plate D, see FIGURES 4, 7 and 12. The notches 30 also receive a key keeper spring F, shown in FIGURE 7 when the key is in a certain position. The spring F keeps the key H1 from being pulled out from the lock unless the key is in the 12 o'clock position.

Figures 2, 3:
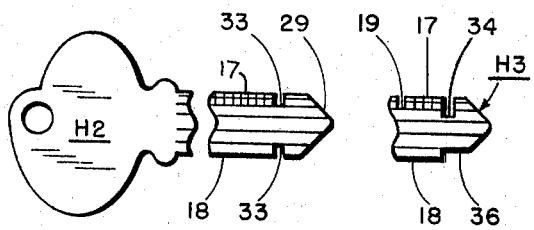
FIGURE 2 is a view of a "master" key which can be used in the cycle lock.
FIGURE 3 is a view of the end portion of a "grand master" key which can be used in the cycle lock.

The "master" key H2 is shown in FIGURE 2 and is the same as the key H1 except that the guide notches 33 in the key are deeper than the notches 30 in the "subordinate" key H1. The key H2 can be rotated from the 12 o'clock to the 9 o'clock position and the arcuate edge portion 12 in FIGURE 13 will permit this. The shoulder 32 on the rear keeper plate D' will strike the "subordinate" key H1 and prevent this key from being rotated into the "master" portion of the lock which is from 12 o'clock to 9 o'clock position.

The "grand master" key H3 is like the other two keys excepting that the guide notch 34 in the ridge 17 is still deeper than the guide notch 33, and the cut away portion 36 on the edge 18, shown in FIGURE 3, permits the key to be removed when the key is at 3 o'clock. This guide notch permits the "grand master" key to be rotated from the 12 o'clock position in a counter-clockwise direction and pass the 9 o'clock position whereas the "master" key H2 would be stopped by abutting the looped end 27 of the spring F when it reached this position, see FIGURE 16. The deeper notch 34 will receive the end of the wire at the looped end 27 of the spring F and permit the "grand master" key H3 to be rotated farther. The functions of all three keys H1, H2 and H3 will be explained more fully as the specification proceeds. I will now describe the tumblers G.

Figure 21:
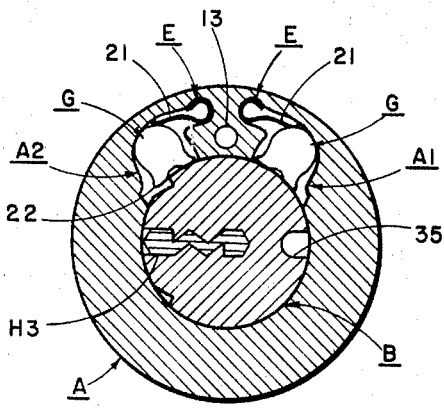

In FIGURE 21, I show the cycle lock casing A provided with two longitudinally extending cavities A1 and A2 for receiving sets of tumblers G. Each tumbler has a thickness equal to the width of a notch 19 in the key ridge 17 shown in FIGURE 1. The thickness of two tumblers G when placed side by side would equal the width of the larger notch 19a also shown in FIGURE 1. The set of tumblers G in the casing cavity A1 are shown in neutral position in FIGURE 21 and are acted upon by the "subordinate" key H1. The set of tumblers G in the casing cavity A2 are shown in neural position in the same figure and are acted upon by the "master" key H2, shown in FIGURE 2.

The tumblers G in each of the two sets are all identical to each other and FIGURE 7 shows some of them removed from the casing cavity and indicates their thickness while FIGURE 4 shows them one against another in the cavity A1. FIGURE 18 shows the shape of the tumbler G and the three views in this figure indicate the three positions into which the tumbler can be rotated. The left hand view indicates "neutral" or unlocked position while the center view shows the tumbler from the cavity A1 in locked position after having been acted upon by a clockwise rotation of the key H1 in the plug, the key being rotated from the 12 o'clock to the 3 o'clock position. This position is termed clockwise locked position. The right hand view of the tumbler G in FIGURE 18 is from the "master" cavity A2 and shows it in locked position after having been acted upon by the counter-clockwise rotation of the "master" key H2 from the 12 o'clock to the 9 o'clock position. This position of the tumbler is called the counter-clockwise locked position. The arcuate line contacting each tumbler G in the three views of FIGURE 18 represents the plug B.

The tumblers G in both sets are normally in neutral position and are yielding held against the periphery of the cylindrical portion of the plug B by the two comb-like leaf springs E, one for each tumbler set, see FIGURES 15 and 17. The cavities A1 and A2 in this figure are reversed from that shown in FIGURE 21 because in FIGURE 15, a person is looking from the rear end of the cycle lock casing. The length of the comb-like leaf spring base 20 is equal to the lengths of the cavities A1 and A2, and the tines 21 on the combs are equal in number to the number of tumbler G. Each tumbler G is under constant yielding pressure from its associate spring finger or tine 21. The comb-like leaf spring E is inserted as a unit into each cavity A1 and A2 and the ends of the base 20 of the spring E contact with the keeper plates D and D'.

Each tumbler G has two spaced apart lobes 22 and 23, see FIGURE 18, and the body of the tumbler is solid and it has a substantially circular periphery. The tumbler is capable of engaging the periphery of the plug B with either of its lobes 22 or 23. Two main modes of blocking the rotation of the plug B by the tumbler G are shown in FIGURES 19 and 20. In FIGURE 19, the key H1 is in the key slot 15 in the plug B and a notch 19 in the key lies in the same plane as the plane of the tumbler G that is in the cavity A1 of the lock body A. The comb E has its tine 21 bearing against the tumbler G for urging it against the plug periphery. The tumbler G has been in "neutral" position and as the key H1 rotates the plug B clockwise as indicated by the arrow in FIGURE 19, the spring tine 21 will press down upon the tumbler to cause the lobe 22 to move down into the key notch 19 and this will permit the lobe to enter the portion of the key slot 15 adjacent to the periphery of the plug. When the lobe 22 enters the key slot 15, further clockwise rotational movement of the plug is prevented. The small arrows on the tumbler G in FIGURE 19, indicate how the rotational plug movement force is picked up by the tumbler lobe 22 and how this force will move the tumbler in the cavity A1 and cause the other tumbler lobe 23 to strike the cavity wall and prevent further clockwise rotation of the plug.

The other mode of tumbler blocking the rotation of the plug B is shown in FIGURE 20. The tumbler G has previously been rotated into "locked" position by the plug B in a manner hereinafter described. The key H1 in the key hole 15 is rotating the plug B in a clockwise direction. The key does not have a notch 19 registering with the tumbler G and therefore is not the proper key in this instance to rotate the plug. The spring tine 21 of the comb-like leaf spring E urges the tumbler lobe 23 against the plug periphery and when the open side of the key slot 15 reaches the tumbler G, the lobe 23 will be forced into the slot and will come to rest against the ridge 17 of the key H1. The small arrows on the tumbler G in FIGURE 20 indicate how the tumbler lobe 23 prevents further clockwise rotation of the plug B in the lock casing A. The side of the key slot 15 contacted by the lobe 23 will cause the circular portion of the tumbler to bear against the wall of the cavity A1 and prevent any further clockwise rotation of the tumbler.

FIGURES 19 and 20 illustrate the two ways and the only two ways that the key-to-tumbler mismatch can occur. The first is termed "unlocked position mismatch" as in FIGURE 19, and the second is termed "locked position mismatch" and is shown in FIGURE 20. These two forms of mismatch may occur separately or in combination in practice and when one or the other or both forms of mismatch do occur, it is impossible to perform the unlocking operation of the plug B.

When the cycle lock is first ready for use, the tumblers G in both the "subordinate" cavity A1 and in the "master" cavity A2 are in "unlocked" position and the key slot 15 of the plug B is in the 12 o'clock position. The tumbler receiving cavities A1 and A2 are shown reversed in FIGURE 15 because the rear of the lock is being shown as indicated by the section line 15—15 in FIGURE 14. I will first describe how the key slot 15 can be rotated to the 3 o'clock position when looking at the front of the lock in order to receive the "subordinate" key H1 so as to insert the combination of notches 19 in this key into the "subordinate" tumbler set.

The "grand master" key H3 is inserted into the key slot 15 in FIGURE 15 with the plain ridge 18 of this key, uppermost in the slot. The key H3 is now rotated counter-clockwise in FIGURE 15 (clockwise when looking at the front of the lock) so that the plain ridge 18 will move past the tumblers G in the "subordinate" tumbler set A1 and will not disturb the neutral setting of the tumblers. When the key H3 reaches the 3 o'clock position (9 o'clock when looking at FIGURE 15), the cut away portion 36 will permit the key to be pulled free of the key keeper spring F. The lock is now ready to have a "subordinate" key H1 to enter the key slot 15.

Figure 22:
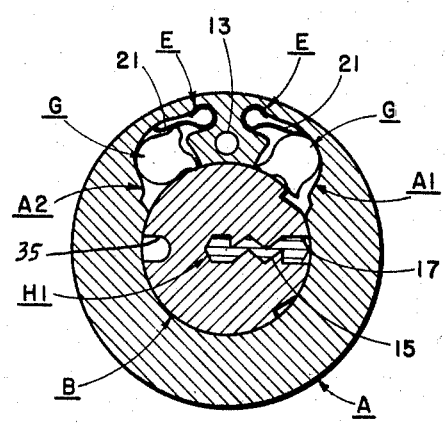

The key H1 is now inserted into the key slot 15 of the plug B, when the slot is in the 3 o'clock position as shown in FIGURE 22. The key is rotated counter-clockwise through a 90° arc to the 12 o'clock position shown in FIGURE 24, and in doing so the ridge 17 will pass the "subordinate" set of tumblers G in the cavity A1 and the rotation of the plug will actuate the lock so that the "subordinate" mechanism is in full locked position. As soon as the key H1 is inserted into the key slot 15, it will be held from being manually withdrawn until the key is rotated to the 12 o'clock position. The means for accomplishing this consists of the keeper spring F. A plan and an edge view of the spring are shown in FIGURE 7, where the spring is separated from the lock. FIGURES 4 and 16 show the keeper spring F as having an arcuate portion 24 that is received in the annular groove 11 in the plug B. The lower portion of the end plate C has double the thickness as the upper portion and FIGURE 5 shows the upper portion accommodating the rear keeper plate D'. FIGURE 13A shows the relationship between the rear keeper plate D' and the keeper spring F. Also FIGURE 16 shows the end plate under certain circumstances as explained hereinafter, and the plate also has a recess 26 opening into the groove 25 and receiving the looped end 27 of the spring. The rear keeper plate D' has a recess for receiving part of the loop 27, see FIGURE 13. This looped end prevents rotation of the spring when the plug B is rotated by the key H1. The looped end 27 is in the 9 o'clock position when looking at the front of the cycle lock. FIGURE 16 is looking at the rear of the lock and therefore the looped end 27 is in the 3 o'clock position.

In FIGURE 16, the spring F is shown with its arcuate portion 24 notched on its inner side at 28. The end of the key H1 is wedge-shaped at 29, see FIGURE 1, so that when the key is inserted into the key slot 15, while the latter is in the 3 o'clock position, the pointed key end will enter the notch 28 to spring the arcuate portion 24 outwardly and move it into the oval groove 25. When the key H1 is fully inserted, the arcuate portion will spring back into one of the dual notches 29 and prevent the key from being withdrawn from the lock. The key must be rotated into the 12 o'clock or "locked" position before it can be removed from the lock. FIGURE 16 shows the end 31 of the spring F terminating adjacent to the 12 o'clock position, so that when the key H1 reaches this position in its rotation, the key notch 30 will be moved out of engagement with the end 31 of the spring. The key may now be withdrawn from the lock.

Figure 23:
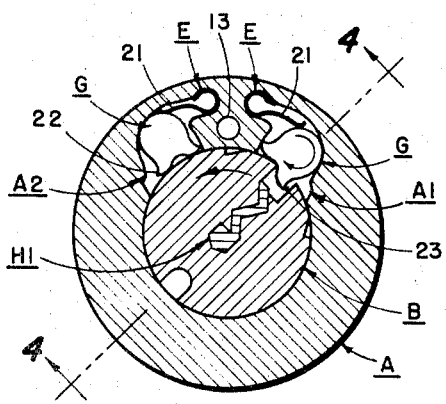

The operator in rotating the "subordinate" key H1 from the 3 o'clock to the 12 o'clock position, causes the key ridge 17 to pass the tumblers G in the "subordinate" tumbler set in the cavity A1 of the casing A. Whenever there is a tumbler receiving notch 19 in the ridge 17, that registers with a tumbler, the spring E will have its tine 21 push the tumbler lobe 23 into the key notch as shown in FIGURE 23, and the counterclockwise rotation of the plug B will rotate the tumbler clockwise from the position of FIGURE 23 to the "locked" position of FIGURE 24. Conversely, in the area along the ridge 17 where there are no tumbler receiving recesses or notches 19, the tumblers which are in "neutral" or unlocked position of FIGURE 22, will remain in this position. In this way a combination is set up in the "subordinate" tumblers G that will correspond exactly with the combination characteristics of the notches 19 in the key H1. The key H1 can now be rotated to the 12 o'clock position and removed from the lock. The fact that the key can only be removed from the lock when it is in the 12 o'clock position, assures the guest that his room door is locked when he removes his key. The key H1 cannot be rotated beyond the 12 o'clock position because the notch 30 is not deep enough to receive an inwardly extending shoulder 32 on the rear keeper plate D', see FIGURES 13, 13A and 16.

Figure 24:
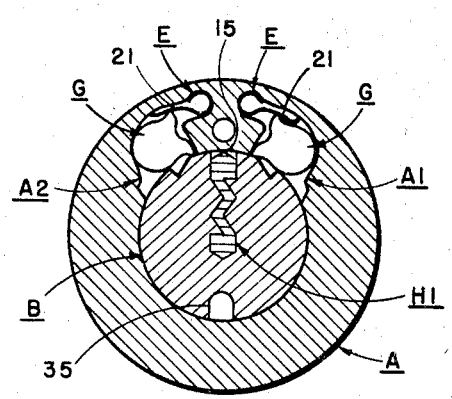
Figure 25:
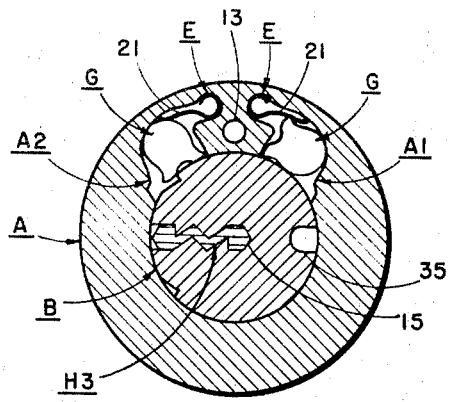

If a wrong "subordinate" key H1 is inserted in the 12 o'clock position of the key slot 15 and is started to rotate clockwise to open the lock, the tumbler G that has previously been rotated into "locked" position by the first used key and shown in FIGURE 24, will be pressed by the spring tine 21, associated with it into the key slot 15, as seen in FIGURE 20 and the lobe 23 of the tumbler will prevent further clockwise rotation of the plug B as has previously been explained. Also if the wrong "subordinate" key H1 has a notch 19 that registers with a tumbler G that is still in "neutral" or unlocked position, the lobe 22 of this tumbler will be forced into the key slot 15 as shown in FIGURE 19 and will prevent further clockwise rotation of the plug B. This has also been previously explained.

It is possible to use a "master" key H2 shown in FIGURE 2 for opening the cycle lock without disturbing the tumbler combination already set up in the "subordinate" tumbler set in the cavity A1. Such a "master" key could be used by a maid of a hotel where the room was to be cleaned while the guest was away. A "master" set of tumblers G are mounted in a second cavity A2 in the casing A and is positioned between the 9 o'clock and 12 o'clock positions, see FIGURES 21 to 26 inclusive. The tumblers G, in the "master" set are spring-biased by another comb E and tines 21, one for each tumbler.

The "master" key H2 is the same as the "subordinate" key H1 except that the dual notches 33 in the "master" key that are placed near the pointed end 29 of the key are made deeper than the dual notches 30 in the "subordinate" key. The "master" cycle lock tumbler set in the casing cavity A2 may employ one or more levels of master keys depending upon the objectives and range and flexibility desired in a particular security system. Two or more levels of master keys are herein referred to as a family of master keys. The significant difference between the "master" keys as such and the permissive or "subordinate" keys H1, is distinguished by the tip characteristics of the various key types. The guide notch 30 in the "subordinate" key H1 is not as deep as the guide notch 33 in the "master" key H2 or as deep as the still deeper guide notch 34 in the "grand master" key H3, illustrated in FIGURE 3.

The various depths of the guide notches 30, 33 and 34 shown in the three keys H1, H2 and H3, respectively, serve to establish rotational limits for the keys, or to provide a simple means for stopping a particular key when it has completed a desired functional movement. The "subordinate" key H1 cannot be rotated beyond the 12 o'clock position, as already stated because its guide notch 30 is of an insufficient depth to receive the shoulder 32 on the rear keeper plate D' as shown in FIGURE 13. Since it is paramount that all functions of the "master" tumbler set at A2 be under the final control of the "grand master" key H3, in FIGURE 3, it follows that the "grand master" key must be used to set up the "master" combination in the tumblers G in the cavity A2, and, conversely, to clear the "master" combination preparatory to introducing a new family of "master" keys H2.

To set up a lock combination in the "master" tumbler set in the casing cavity A2, the "grand master" key H3 is inserted into the key slot 15 while the latter is in the 12 o'clock position. The plain ridge 18 of the key is in the top of the slot and as the key is rotated to the 9 o'clock position, the tumblers G will be undisturbed and will remain in "unlocked" position. The key is now withdrawn from the key slot.

With the key slot 15 set to the "unlocked" position at 9 o'clock for the "master" tumbler set in the casing cavity A2, the "grand master" key H3 of FIGURE 3 is reinserted into the key slot with the ridge 17 of the key occupying the portion of the key slot that opens onto the periphery of the plug B. When the key H3 is fully inserted, its guide notch 34 will be positioned in the looped end 27 of the key keeper spring F. The "grand master" key may now be rotated clockwise and the guide notch 34 will receive the end of the spring F forming the loop 27 and permit the key H3 to be rotated past this spring end. By virtue of the greater depth of the guide notch 34 than the notch 30 in the "subordinate" key H1, the inwardly projecting end 31 of the spring F offers no obstruction to the clockwise rotation of the key H3. As the key H3 continues to rotate toward the locked position at 12 o'clock, the key ridge 17 will move past the "master" tumbler set in the casing cavity A2. Where ever a tumbler receiving notch 19 appears in the ridge 17 of the key H3, a tumbler lobe 22 of the tumbler G, lying in the plane of the notch will enter the key notch and engage with the wall of the key slot. This will result in the tumbler being rotated into "locked" position.

In areas along the length of the "grand master" key H3 where no tumbler receiving notches 19 appear, the tumblers associated with these areas will remain undisturbed and in neutral or unlocked position. Thus the key H3 in passing through the "master" tumbler channel or cavity A2 from the 9 o'clock to the 12 o'clock position produces a "scrambled" tumbler arrangement or a combination corresponding exactly to the combination characteristics of the "grand master" key. After the key H3 is removed from the lock, the "master" tumbler set in the cavity A2 will be in "locked" position and the "subordinate" tumbler set in the cavity A1 will be "locked" position. The cycle lock is now said to be in "full locked" position. The "subordinate" tumbler set can be unlocked by the correct "subordinate" key H1 and the "master" tumbler set can be unlocked by the correct "master" key H2. Neither key can perform the unlocking function of the other because each tumbler channel is ostensibly locked to a different key combination.

The "master" key H2, shown in FIGURE 2, can operate only between the "locked" position at 12 o'clock and the "unlocked" position at 9 o'clock. The notch 33 in the key H2 is not deep enough to permit the key to pass the end of the keeper spring F adjacent to the loop 27 and therefore the "master" key cannot be removed from the lock when the key is in "unlocked" position. Consequently the "master" key H2 may only be used to actuate the "master" cycle lock tumblers from locked to unlocked position for permitting the door, not shown, to which the lock is attached, to be opened and then the key can be rotated back again for locking the closed door before the key can be removed. The ridges 17 of the "master" keys would have a compatible combination of notches as the "grand master" key H3.

It is possible to clear both the "master" and the "subordinate" sets of tumblers and bring them into "unlocked" position. First the "grand master" key H3 is inserted into the key slot 15 when the latter is in the 12 o'clock position and the ridge 17 of the key is in the slot portion that opens out to the periphery of the plug B. The key H3 is rotated counter-clockwise through the "master" tumbler set in the casing cavity A2. This causes all "master" tumblers, however they are "scrambled," to be returned to neutral or "unlocked" position as the key is rotated to the 9 o'clock position. Continuing the counter-clockwise rotation of the key H3, the guide notch 34 will pass under the spring end F at the looped portion 27 and then the key ridge 17 will approach the 6 o'clock position.

Figure 26:
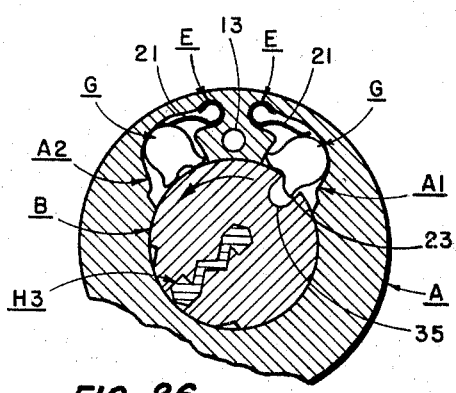

During this rotation of the key H3 and the plug B, the tumbler reset longitudinally extending groove 35 will move from the 6 o'clock position shown in FIGURE 24 toward the 12 o'clock position shown in FIGURE 26. As the tumbler reset groove 35 passes under the "subordinate" tumbler set G in the casing cavity A1, the lobes 23 of all tumblers G remaining in neutral or "unlocked" position will be forced into the groove by their associate spring tines 21 and the rotating plug B will rotate these tumblers into "locked" position. The "grand master" key H3 is now reversed in its rotation and as the reset groove 35 passes under the "subordinate" tumbler set in a clockwise direction, all of the tumblers G will have their lobes 23 drop into the groove. Continued clockwise rotation of the plug B will return all of the "subordinate" tumblers to neutral or unlocked position.

As the clockwise rotation of the "grand master" key H3 continues, the guide slot 34 in the key, see FIGURE 3, again passes under the end of the key keeper spring F at the loop 27 and continued rotation will move the key ridge 17 through the "master" tumbler set in the cavity A2. In doing this, the tumbler lobes 22 of the tumblers G which are aligned with a tumbler receiving notch 12 are again rotated into "locked" position. Thus the "grand master" key H3 reestablishes its combination in the "master" tumbler set in the cavity A2 as the key is rotated up to the 12 o'clock position.

At this point the operator knows the identity of the combinations in both the "subordinate" and "master" tumbler sets. The key H1 can now no longer unlock the "subordinate" tumbler set because its combination was obliterated the instant the reset groove 35 moved counter-clockwise from the 6 o'clock to the 12 o'clock position. But inasmuch as the key slot 15 has been returned to the 12 o'clock position by the "grand master" key H3, the cycle lock is actually in "full locked" position. Therefore a proper key is required to move the key slot 15 to either of its two "unlocked" positions. The "subordinate" tumbler set in effect has been locked with a blank key, i.e., one where the ridge 17 is continuous from one end of the key to the other. Hence it is necessary to use such a blank key to rotate the plug B and key slot 15 from the 12 o'clock to the 3 o'clock position.

Now inasmuch as the reverse edge 18 of the "grand master" key H3 is blank, it is only necessary to remove the key H3 from the key slot 15 and rotate the key 180° and then reinsert it into the key slot. The key H3 can now be rotated to the "unlocked" position. The key H3 can be removed from the plug B when it is in the 3 o'clock position because opposite the groove 34 in the key there is a cut away portion 36, see FIGURE 3, which permits the key to be pulled free of the key keeper spring F. The cycle lock is now ready for receiving a new "subordinate" key H1 which will place its own combination in the "subordinate" tumbler set when the key is inserted into the lock and rotated from the 3 o'clock to the 12 o'clock position.

It is possible to change the "master" key families and in practice it is essential to do so for many reasons. The "grand master" key H3 is the one used to make possible the change in the "master" keys. This can be carried out without disturbing the "subordinate" or permissive keys H1 combinations or otherwise inconveniencing the tenants and guests in hotels. To change the "master" key families, a new "grand master" key H3 is chosen and configured to any arbitrary combination desired. The mechanics of changing "master" and "grand master" keys H2 and H3, requires first that the existing combination in the "master" channel A2 be cleared preparatory to transferring the control to a new "grand master" key. Clearing the combination in the tumbler set G in the channel A2 involves the use of the "grand master" key currently in use in the manner already explained and then extracting the key H3 when it is in registration with the loop 27 and can be removed from the lock. The new "grand master" key H3 may now be inserted into the key slot 15 and can set up its own combination in the "master" tumbler set at A2. The "master" keys H2 must have the same combination as that of the new "grand master" keys except that the key H3 may differ from the keys H2 wherever a blank tumbler space appears.

The means for stopping further rotation of the "subordinate" key H1 after it has been rotated from the "locked" 12 o'clock position to the "unlocked" 3 o'clock position, is the stop notch 28 in the key keeper spring F. The notch 28 engages with the bottom edge of the guide notch 30 in the key H1.

It is possible to have a plurality of "master" keys levels and this is accomplished by the use of one or more blank tumblers J or spacer discs shown in FIGURES 27 and 28. These spacer discs J take the place of tumblers G in the "master" tumbler set. The presence of one spacer disc J makes possible two "master" keys H2 and the use of two spacer discs makes possible four "master" keys, etc. If one spacer disc J is used, one "master" key H2 could have no notch 19 lying in the plane of the disc and another "master" key H2 could have a notch 19 lying in the plane of the disc. Both "master" keys could be used and the discs J would have no effect on either as each key was rotated past the "master" tumbler set in which the disc formed a part. The provision of a second disc J in the "master" tumbler set would permit the use of two additional "master" keys H2. FIGURE 27 shows the spacer disc J mounted in the casing cavity A2 and the associate spring tine 21 of the comb-like spring E will bear against the disc periphery. The disc cannot prevent the plug B from being rotated by the key. All other parts of the cycle lock in FIGURE 27 are the same as that already described and further description of the discs J need not be given.

The keys H can have their own combinations set up in them by the operator. An enlarged elevation of a portion of the key is shown in FIGURE 29 and a transverse section is also shown at FIGURE 29A. The ridges 17 and 18 are divided into sections 17a and 18a by transverse cuts 37 and 38, respectively, that extend across the ridges. The web 16 that extends between the ridges 17 and 18 of the key H4, is zig-zag in cross section and shoulders 39 and 40 are formed between the ridges 17 and 18 and the web. The cross section in FIGURE 29 further shows the ridge 17 being provided with an inwardly extending cut 41 that parallels the key edge and extends toward the shoulder 39. This provides a "weakened" connecting portion between each section 17a and the adjacent web 16 of the key. The operator can set up his own key combination by breaking off one or more of the sections 17a to form the key notches 19 in the key as indicated in FIGURE 1.

The cross section in FIGURE 29A also shows an inwardly extending cut 42 that parallels the other key edge and extends toward the shoulder 40. This provides a weakened portion between each section 18a and the adjacent web 16 of the key. The operator can set up a different combination along the ridge 18 by breaking off one or more sections 18a to form key notches. The handle 43 of the key is nonsymmetrical and has opposite sides 43a and 43b that are shaped differently from each other. The side 43a is associated with the ridge 17 of the key while the side 43b is associated with the ridge 18. An operator can use the key in the dark and know which side 17 or 18 is placed uppermost in the key slot.

I provide novel means for preventing the cycle lock from being picked. FIGURES 8B, 10, 20 and 20A, show the plug B provided with a pair of "safety" notches 44 and 45, one being disposed on each side of the key slot 15 and extending throughout the length of the cylindrical portion of the plug. The tumbler G in the casing cavity A1 in FIGURE 20 is shown entering the key slot 15 and bearing against a side wall of the slot to prevent further clockwise rotation of the plug B. If now the cycle lock could be "picked" by someone forcing an instrument along the key slot 15 to lift the tumbler G out of the slot recess, further clockwise rotation of the plug B by the key would be stopped when the tumbler would have its lobe 23 forced into the ratchet shaped or shouldered groove 44 in the plug periphery by the tine 21 of the spring E. The key slot 15 is now out of registration with the lobe 23 of the tumbler G and an instrument forced along the slot could not reach the lobe to lift it out of the groove. The same is true when the plug B is rotated in a counter-clockwise direction. In this case the tumbler G would have its lobe enter the ratchet notch 45 to prevent further rotation of the plug B. Groove 44 serves the "subordinate" tumblers G in the casing cavity A1 while the groove 45 serves the "master" tumblers G in the casing cavity A2.

I claim:
1. A cycle lock comprising:
 (a) a casing;
 (b) a cylindrical plug rotatably mounted in said casing and having a key-receiving slot therein that opens out to the cylindrical surface;
 (c) a set of tumblers in said casing and being disposed between an unlocked position of said plug and a locked position;
 (d) a key receivable in said key slot when said plug is in its unlocked position and adapted to be rotated for rotating the plug from the unlocked position into locked position, said key being provided with one or more recesses that open out into the key slot portion that lies adjacent to the plug periphery for permitting certain tumblers that are aligned with these recesses to be rotated from unlocked to locked position during the movement of the key past said tumblers;
 (e) whereby said key sets up its own locking combination in said tumblers, the tumblers that have been moved into locked position by the rotation of said key and plug from unlocked to locked position, preventing the return rotation of said plug from locked to unlocked position unless the same key is used;
 (f) said cylindrical plug having a shouldered groove paralleling the portion of the key slot opening onto the plug periphery and being spaced from this slot portion so that it will move into registration with said tumblers after said key slot passes the tumblers during the rotation of the plug from locked to unlocked position by said key, said shouldered groove receiving any tumbler that is in locked position and the tumbler preventing any further rotation of said plug into unlocked position.

2. The combination as set forth in claim 1, and in which:
 (a) a second set of tumblers are disposed between said locked position of said plug and a second unlocked position of said plug, said second unlocked position being arranged at a different angular position of said plug from said first unlocked position;
 (b) a second key receivable in said key slot when said plug is in said second unlocked position and adapted to be rotated for rotating said plug from said second position into locked position, said second key being provided with one or more recesses for permitting certain tumblers in said second tumbler set that are aligned with these recesses to be moved from unlocked to locked position;
 (c) whereby said second key sets up its own locking combination in said second set of tumblers; the tumblers in said second set that have been moved into locked position by the rotation of said second key and said plug from said second unlocked position to said locked position, preventing the return rotation of said plug from locked to said second unlocked position unless the same said second key is used;
 (d) said cylindrical plug having a second shouldered groove paralleling the portion of the key slot opening onto the plug periphery but being spaced from this slot portion and on the opposite thereof from said first-mentioned shouldered groove so that second groove will move into registration with said second tumbler set after said key slot passes this second tumbler set during the rotation of said plug from said locked position to said second unlocked position by said second key, said second groove receiving any second set tumbler that is in locked position, said second position locked tumbler preventing any further rotation of said plug into said second unlocked position.

3. The combination as set forth in claim 2, and in which:
 (a) at least one disc is placed in said second tumbler set, said disc permitting the portion of the edge of the second key lying in the plane of the disc to pass by said disc during the rotation of the second key and plug whether or not the second key has a notch lying in the plane of said disc.

4. A cycle lock of the type set forth in claim 2, in which:
 (a) means is provided for preventing said first key from rotating said plug from locked position into said second unlocked position.

5. A cycle lock of the type set forth in claim 1, and in which:
 (a) means is provided for preventing the removal of said key from said key slot when the key is inserted therein when said plug is in said first unlocked position;
 (b) whereby said key must rotate said plug from said unlocked position into said locked position before said key can be removed from said plug.

6. A cycle lock of the type set forth in claim 2, and in which:
 (a) means is provided for preventing the removal of said first key from said key slot when the first key is inserted into said slot when said plug is in said first unlocked position;
 (b) whereby said first key must rotate said plug from said first unlocked position into said locked position before said first key can be removed from said plug.

7. A cycle lock of the type set forth in claim 2, and in which:
 (a) means is provided for preventing the removal of said second key from said key slot when said plug is in its second unlocked position;
 (b) whereby said second key must rotate said plug from said second unlocked position into said locked position before said second key can be removed from said plug.

8. A cycle lock of the type set forth in claim 2, and in which:
 (a) the locked position of said plug lies between the first and said second unlocked positions of said plug;
 (b) a third key receivable in said key slot for rotating said plug beyond said second unlocked positions and further away from locked position;
 (c) said plug having a longitudinal second recess in its cylindrical surface that is brought into registration with said first-mentioned tumbler set when said third key rotates said plug beyond said second unlocked position;

(d) the first-mentioned set tumblers that have not already been moved into locked position by said first key having lobes receivable in said second recess; whereby these tumblers will be moved into locked position by said plug recess as said tumbler is rotated by said third key;

(e) the rotation of said third key then being reversed for rotating said plug in the opposite direction for again moving the plug recess past said first tumbler set, but in the opposite direction;

(f) all of said first set tumblers having lobes receivable in said recess during the return plug rotation, said recess moving all of said first set tumblers into unlocked position.

9. A cycle lock comprising:
(a) a casing;
(b) a cylindrical plug rotatably mounted in said casing and having a key-receiving slot therein that opens out to the cylindrical surface;
(c) a set of tumblers in said casing and being disposed between an unlocked position of said plug and a locked position;
(d) a key receivable in said key slot when said plug is in its unlocked position and adapted to be rotated for rotating the plug from the unlocked position into locked position, said key being provided with one or more recesses that open out into the key slot portion that lies adjacent to the plug periphery for permitting certain tumblers that are aligned with these recesses to be rotated from unlocked to locked position during the movement of the key past said tumblers;
(e) whereby said key sets up its own locking combination in said tumblers, the tumblers that have been moved into locked position by the rotation of said key and plug from unlocked to locked position, preventing the return rotation of said plug from locked to unlocked position unless the same key is used;
(f) each tumbler being non-resilient and having a pair of spaced apart lobes adapted to be individually received in the open side of said key slot when said plug is rotated by said key to move the key slot open side past said tumblers and said key has a notch lying in the plane of said tumbler;
(g) said tumblers having faces adapted to abut the faces of adjacent tumblers, the planes of said tumblers extending at right angles to said plug axis;
(h) a comb-like spring having a plurality of flexible tines, each tine bearing against the periphery of an associated tumbler and yieldingly urging the tumbler toward said plug periphery.

10. A cycle lock comprising:
(a) a casing;
(b) a cylindrical plug rotatably mounted in said casing and having a key-receiving slot therein that opens out to the cylindrical surface;
(c) a set of tumblers in said casing and being disposed between an unlocked position of said plug and a locked position;
(d) a key receivable in said key slot when said plug is in its unlocked position and adapted to be rotated for rotating the plug from the unlocked position into locked position, said key being provided with one or more recesses that open out into the key slot portion that lies adjacent to the plug periphery for permitting certain tumblers that are aligned with these recesses to be rotated from unlocked to locked position during the movement of the key past said tumblers;
(e) whereby said key sets up its own locking combination in said tumblers, the tumblers that have been moved into locked position by the rotation of said key and plug from unlocked to locked position, preventing the return rotation of said plug from locked to unlocked position unless the same key is used;
(f) each tumbler being non-resilient and having a pair of spaced apart lobes, one of which is adapted to be individually received in the open side of said key slot when said plug is rotated by said key to move the key slot open side past said tumblers from unlocked to locked position and said key has a notch lying in the plane of said tumbler;
(g) spring means bearing against the periphery of each tumbler for urging individual tumblers against said plug periphery and permitting rotation of any tumbler from unlocked to locked position whose plane lies in the plane of the key notch and whose lobe is received in the open side of said key slot as the plug is rotated by said key from unlocked to locked position;
(h) any tumbler in locked position having a lobe movable into the open side of said key slot when the latter registers with said lobe as said plug is being rotated from locked to unlocked position by a wrong key, the edge of said key permitting only a partial entrance of the lobe into the key slot since it does not have a notch registering with said lobe and preventing rotation of said tumbler from locked to unlocked position;
(i) whereby the lobe of the tumbler that is in locked position will engage with the wall of said key slot and prevent further rotation of said tumbler toward unlocked position.

11. In a cycle lock:
(a) a casing;
(b) a plug having a cylindrical outer surface and a key slot in said plug with one edge of said slot opening out onto the cylindrical surface;
(c) a first key insertable into said slot for rotating the plug from a first unlocked position to a locked position;
(d) a set of key actuated tumblers operatively mounted in said casing and disposed between the unlocked and locked positions;
(e) a second key insertable into said key slot for rotating the plug from a second unlocked position to said locked position, said second unlocked position being disposed on the opposite side of the locked position from that of the first unlocked position;
(f) a second set of tumblers actuated by said second key and mounted in said casing between the locked and second unlocked positions of said tumbler;
(g) the tumblers in each set being the same, each tumbler being nonresilient and having spaced apart lobes adapted to be individually received in the open side of said key slot when said plug is rotated by either of said keys to move the key slot open side past said tumbler sets;
(h) spring means bearing against the periphery of each tumbler for urging the tumblers of each set toward the plug, the tumblers initially being in neutral position with both lobes contacting with the plug periphery;
(i) said first key having at least one notch in the key edge that opens into the open periphery portion of said key slot, the tumbler in said first set lies in the plane of this slot having one of its lobes enter the slot and be moved by the rotating tumbler for rotating the tumbler into locked position as the key rotates said plug from said first unlocked position into locked position; and
(j) said second key having at least one notch in the key edge that opens into the open periphery portion of said key slot, the tumbler in said second set lies in the plane of this slot having one of its lobes enter the slot and be moved by the rotating tumbler for rotating the tumbler into locked position as said second key rotates said plug from said second unlocked position into locked position.

12. In combination:
(a) a cylindrical plug rotatable by a key and having a recess in its periphery;
(b) a tumbler having a circular peripheral portion with two spaced apart lobes, both of which contact with the periphery of said plug when said tumbler is in neutral position; and
(c) spring means bearing against the periphery of each tumbler for yieldingly holding said tumbler in contact with said tumbler periphery so that the recess lies in the same plane as said lobes, the plane also being at right angles to the axis of said plug;
(d) whereby a rotation of said plug in one direction to move the recess past said tumbler will cause the lobe disposed nearest to the recess to move therein and cause said tumbler to rotate into a locked position, and a rotation of said plug in the opposite direction to move the recess, when on the opposite side of said tumbler, past the tumbler will cause the other lobe disposed nearest to the recess to move therein and cause said tumbler to rotate from neutral position and in an opposite direction into a second locked position.

References Cited

UNITED STATES PATENTS

| | | | |
|---|---|---|---|
| 1,204,545 | 11/1916 | Christoph | 70—408 X |
| 1,528,641 | 3/1925 | Vives | 70—411 |
| 1,537,049 | 5/1925 | Vives | 70—411 |
| 2,596,720 | 5/1952 | Pastor et al. | 70—419 X |
| 2,083,358 | 6/1937 | Bell | 70—408 X |
| 2,105,099 | 1/1938 | Schuyler | 76—110 |
| 2,422,600 | 6/1947 | Swanson | 70—340 |
| 3,255,620 | 6/1966 | Quillen | 70—383 |

FOREIGN PATENTS

| | | |
|---|---|---|
| 641,080 | 8/1950 | Great Britain. |
| 484,162 | 8/1953 | Italy. |

MARVIN A. CHAMPION, *Primary Examiner.*

PERRY TEITELBAUM, *Assistant Examiner.*

U.S. Cl. X.R.

70—377, 406, 408, 411, 421